US012098760B2

(12) United States Patent
Verbridge et al.

(10) Patent No.: US 12,098,760 B2
(45) Date of Patent: *Sep. 24, 2024

(54) DIFFERENTIAL LUBRICATION

(71) Applicant: Rivian IP Holdings, LLC, Plymouth, MI (US)

(72) Inventors: Mason Verbridge, Canton, MI (US); Gary Allen Pinkley, Northville, MI (US); Caleb Alex Morris, Bloomington, IL (US); George Zalanca, Windsor (CA)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,888

(22) Filed: May 12, 2023

(65) Prior Publication Data

US 2023/0304567 A1    Sep. 28, 2023

Related U.S. Application Data

(63) Continuation of application No. 17/554,829, filed on Dec. 17, 2021, now Pat. No. 11,649,884.

(51) Int. Cl.
*F16H 57/04*    (2010.01)
*F16H 48/285*    (2012.01)

(52) U.S. Cl.
CPC ......... *F16H 48/285* (2013.01); *F16H 57/043* (2013.01); *F16H 57/0483* (2013.01); *F16H 57/0428* (2013.01)

(58) Field of Classification Search
CPC ............... F16H 57/043; F16H 57/0483; F16H 57/0428; F16H 57/0427; F16H 48/40; F16H 57/0424
See application file for complete search history.

(56) References Cited

U.S. PATENT DOCUMENTS 3,182,527 A    5/1965 Bryan
3,741,343 A * 6/1973 Lindenfeld ......... F16H 57/0427
184/6.12

(Continued)

FOREIGN PATENT DOCUMENTS

CN    207034127 U    2/2018
EP    0280093 B1 *  4/1991

(Continued)

OTHER PUBLICATIONS

"Spiral Groove", A blank spiral groove on the inside of a recording disc, next to the label, Modern Dictionary of Electronics (Seventh Edition), 1999.

(Continued)

*Primary Examiner* — Sherry L Estremsky
(74) *Attorney, Agent, or Firm* — HALEY GUILIANO LLP (57) ABSTRACT

A vehicle powertrain may include a differential assembly having a housing disposed partially in a lubrication reservoir. The differential assembly translates rotational motion of a pinion gear to a pair of axle shafts extending from the housing and permits different rotational speeds of the axle shafts. One or more components of the differential assembly, e.g., one or more side gears, may include a plurality of radial grooves configured to distribute a lubricant from the lubrication reservoir while the first side gear rotates.

20 Claims, 6 Drawing Sheets

(56) References Cited

U.S. PATENT DOCUMENTS

| | | | | |
|---|---|---|---|---|
| 5,735,765 | A * | 4/1998 | Teraoka | F16H 57/0483 |
| | | | | 475/248 |
| 10,527,153 | B2 | 1/2020 | Okumoto et al. | |
| 11,649,884 | B1 * | 5/2023 | Verbridge | F16H 57/0427 |
| | | | | 475/160 |
| 2016/0138702 | A1 * | 5/2016 | Yanase | F16H 57/0479 |
| | | | | 475/160 |

FOREIGN PATENT DOCUMENTS

| | | | |
|---|---|---|---|
| JP | 2003-254415 A | 9/2003 | |
| JP | 2006-242295 A | 9/2006 | |
| JP | 2008082544 A * | 4/2008 | F16H 48/08 |

OTHER PUBLICATIONS

Watson, C. et al., "Developing an Optimal Helix Angle As a Function of Pressure for Helical Groove Seals", Fluids Engineering Division Summer Meeting (FEDSM), Jul. 30-Aug. 3, 2017 (Abstract Only).

Zhang, M, et al., "Leakage Characteristic of Helical Groove Seal Designed in Reactor Coolant Pump", Hindawi Publishing Corporation International Journal of Rotating Machinery, vol. 2012, Article ID 619459, Nov. 14, 2012, pp. 1-8 pages.

* cited by examiner

FIG. 7

DIFFERENTIAL LUBRICATION

CROSS-REFERENCE TO RELATED APPLICATIONS

This application is a continuation of U.S. patent application Ser. No. 17/554,829, filed Dec. 17, 2021, the disclosure of which is hereby expressly incorporated by reference herein in its entirety.

INTRODUCTION

The present disclosure is directed to systems and methods for lubricating a differential for a vehicle, and more particularly, to systems and methods that lubricate an open differential.

SUMMARY

Example illustrations herein are directed to a side gear for a differential, e.g., an open differential. In at least some example approaches, a differential system includes one or more passages in a differential casing configured to draw in lubrication from a lubrication reservoir. The system includes one or more radial grooves of a differential side gear, where at least one of the radial grooves comprises an inner point where the lubrication enters the radial groove, and where the lubrication is ejected radially from the inner point to an outer point of the radial groove. In at least some example approaches, a side gear includes a first surface comprising a set of gears or protrusions configured to interface with differential gears of a differential. The protrusions may cover a perimeter edge of the first surface. The side gear may also include a second surface arranged to face opposite to the first surface. The second surface may include a plurality of radial grooves configured to draw in lubrication while the side gear rotates.

In at least some example approaches, a differential assembly includes a housing disposed partially in a lubrication reservoir, the housing enclosing a plurality of interfacing components configured to translate rotational motion of a pinion gear to rotational motion of a pair of axle shafts extending from the housing and permit different rotational speeds of the axle shafts. The plurality of interfacing components may include a pair of differential gears configured to translate rotational motion from the housing to the pair of axle shafts, and at least one side gear driving rotation of a first one of the axle shafts. The side gear may include a first surface comprising a set of gears or protrusions configured to interface with the differential gears, wherein the protrusions cover a perimeter edge of the first surface, and a second surface arranged to face opposite to the first surface. The second surface may include a plurality of radial grooves configured to draw in lubrication from the lubrication reservoir while the first side gear rotates.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale. The above and other objects and advantages of the disclosure may be apparent upon consideration of the following detailed description, taken in conjunction with the accompanying drawings, in which.

DETAILED DESCRIPTION

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

Methods and systems are provided herein for lubricating internal interfaces of a differential assembly.

Current approaches for lubricating a differential may employ a static reservoir of lubrication such that the rotating portions of the differential will pass through the lubrication based on the level of lubrication available in the reservoir. This method is deficient because the lubrication is not uniformly distributed among the various moving and interfacing components as the different components of the differential rotate in response to different inputs into the system. Additionally, the distribution is affected by the static level of lubrication of the reservoir through which the components rotate. For example, if the static level of lubrication is below the inner most radial distance of one of the interfacing gears or center of the side gear, the lubrication may not reach that portion of the gear interface and the components will continue to operate without any lubrication, creating additional operational noise and increasing wear between components. Alternatively, filling the differential with additional lubricant increases overall drag of the differential and reduced powertrain efficiency.

Other approaches rely on forced lubrication to attempt to increase the distribution of lubrication among the interfaces of components within the differential. However, these approaches are also deficient because the addition of the pump or injector mechanism creates packaging issues for the differential assembly within a vehicle suspension environment. Moreover, pumps deliver lubricant to a single location, and thus only provide a single trajectory at which lubrication is introduced to interfaces between moving parts of the differential, creating non-uniform lubrication of the various components. To the extent differential components are consistently operating without lubrication, additional operating noise can manifest, and the parts may fatigue or fail before an expected lifetime has elapsed.

In view of the foregoing, some example systems and methods described herein lubricate a differential by incorporating passages into a differential case as well as a plurality of grooves into a rotating component of the differential, e.g., one or both side gears. A differential may include components such as housing that is rotated by a pinion, e.g., by a side gear fixed to the housing. The housing may contain one or more passages which serve as openings to enable lubricant to be pumped from a static reservoir of lubrication into the interfaces between internal components of a differential. As the side gears rotate in the disconnected state, they create a negative pressure at the inner opening of the passageways, which draws in the lubrication from the static reservoir. Within the differential housing, there may also be at least one drive shaft, axle shaft, or half shaft for translating rotational motion from the powertrain received at the differential to the road wheels. Side gears may be supported within the housing for transmitting rotational motion from the side gear/housing to the axle shafts. Differential gears may be supported on a spindle supported at either end by the housing.

Accordingly, rotation of the housing causes rotation of the spindle, with the differential gears imparting rotational motion to the side gears. The differential may be an open differential, such that different rotating speeds of the axle shafts are permitted, e.g., to accommodate a vehicle turning. The side gear(s) include an interface side having protrusions or gears which mate with the differential gears, and a reverse face which may include a hub. The reverse or opposite face may have a surface with a plurality of grooves formed therein, which may be positioned such that they extend from an outer diameter of the side gear to or adjacent a center of the side gear. In some example approaches, the grooves may have a length sufficient to reach a static lubricant level within the differential. Thus, as the side gear rotates, each groove enters the lubricant that has accumulated at the bottom of the differential housing, with lubricant being drawn into the grooves from the static lubricant level and distributed throughout the interfacing components of the differential assembly. In other example approaches, the static level of lubricant may be relatively lower, with lubricant being pumped or distributed by way of passages in the differential to the grooves in the side gear. In one example, the channels in the housing may be positioned such that an inner opening of the channel aligns with a radially outer end of the grooves in the side gear. In this example, any pumping of the lubrication may result in the lubrication being pooled in the bottom of the housing for the radially outer edge of the side gear to rotate thorough. In another example, the channels in the housing may be positioned such that an inner opening of the channel aligns with a radially inner end of the grooves of the side gear. In this example, any pumping of the lubrication results in a direct translation of the lubrication from the reservoir through the channels to the grooves in the side gear such that the lubrication does not pool in the housing as a result of the pumping and instead the lubrication is readily distributed by the rotation of the side gears.

These example techniques advantageously do not rely solely on a static level of lubrication, as in previous approaches noted above. Instead, a side gear or hub has a plurality of grooves in its face that dip into a static level of lubrication, and through the rotation of the hub, creates a pumping action which draws lubrication into each respective groove through centripetal force and then distributes the lubricant throughout the components of the differential by centrifugal force. Channel(s) in the differential case may serve as continuous feeds of lubrication, as the lubrication previously accrued within the differential housing is distributed among the components. Thus, while a static lubrication level may allow at least a portion of the hub to become at least partially saturated with lubrication, the combination of the channels in the differential case and the grooves on the side gear(s) enable a greater distribution of lubrication throughout the various components of the differential.

Additionally, while in some example approaches a pump may be employed to further assist with lubrication of differential components, the example approaches herein do not rely solely on an external mechanism such as a pump to improve the distribution of lubrication throughout the differential case. Rather, the side gear grooves and/or channels in the differential case improve lubrication using existing components of the differential assembly. More specifically, the side gear grooves in various examples below may reach into the volume of lubricant in the reservoir, and the structure of the grooves draws lubricant into the grooves and, as a result of rotation of the side gear, distributes lubricant about the housing of the differential assembly, thereby providing more consistent lubrication of differential assembly components.

In some embodiments, the radial grooves extend from a diameter proximate a central most point on the surface of the side gear to an outer diameter. In some embodiments, the grooves are arranged to be along a straight radial line, while in other example approaches one or more of the grooves are angled relative to a radial direction of the side gear. The angle of the grooves may correspond to target lubrication rate (e.g., 0.15 Liters per minute) such that the target volume of lubrication is distributed about the differential housing at the target lubrication rate. The angle generally allows for a longer length of the grooves which may enable more of the grooves to enter the lubrication reservoir, thereby distributing a greater volume of lubricant throughout the housing for each pass of the groove and/or rotation of the side gear. Accordingly, the geometry of the grooves, the positioning of the grooves, and rotational speed(s) or range of speeds of the side gears may each influence a volume of lubricant distributed via the grooves.

In some embodiments, at least a portion of the side gear is positioned below the surface of the static reservoir of lubrication. Accordingly, at least a portion of each of the grooves as the side gear rotates is submerged below the surface of the static reservoir of lubrication. The spacing and number of grooves may be determined such that at least one of each of the grooves is submerged in the lubrication reservoir at a time to enable continuous distribution of lubrication at the side gear rotates. The spacing and number of grooves may also be determined such that the volume of the grooves paired with the rotational rate of the side gear enables the differential assembly to receive lubricant at a flow rate comparable to a target rate.

In some embodiments, each of the grooves has at least one opening at one end of the groove. The opening enables the ingress of lubrication into the groove from a lubrication reservoir such that it can be distributed by the rotation of the side gear. The opening also enables the egress of lubrication out of the groove such that it is distributed throughout the differential assembly.

In some embodiments, each of the side gears of a differential assembly include groove feature(s) similar or identical to those of the first side gear, such that a second portion of the differential assembly receives improved lubrication.

In some embodiments, at least a pair of channels are positioned in a lower portion of the differential assembly housing, such that the rotation of the side gear draws in lubrication from the static lubrication reservoir.

In some embodiments, a second channel is positioned in an upper portion of the differential assembly and includes a pump or other mechanism for forcing lubrication through the channel(s) of the housing and/or within the differential. The pump may be configured to draw lubrication from the static lubrication reservoir and expel lubrication into the differential assembly from a vertically upper position, thereby allowing lubricant to be communicated over substantially all interfacing surfaces within the housing. The combination of the pump with the grooves in the side gear further enhances consistent distribution of lubrication throughout the differential assembly.

In some embodiments, the grooves are embedded in a hub separate from the side gear and positioned proximate to the side gear. The hub may be arranged to rotate at the same rate as the side gear.

Figure 1A:
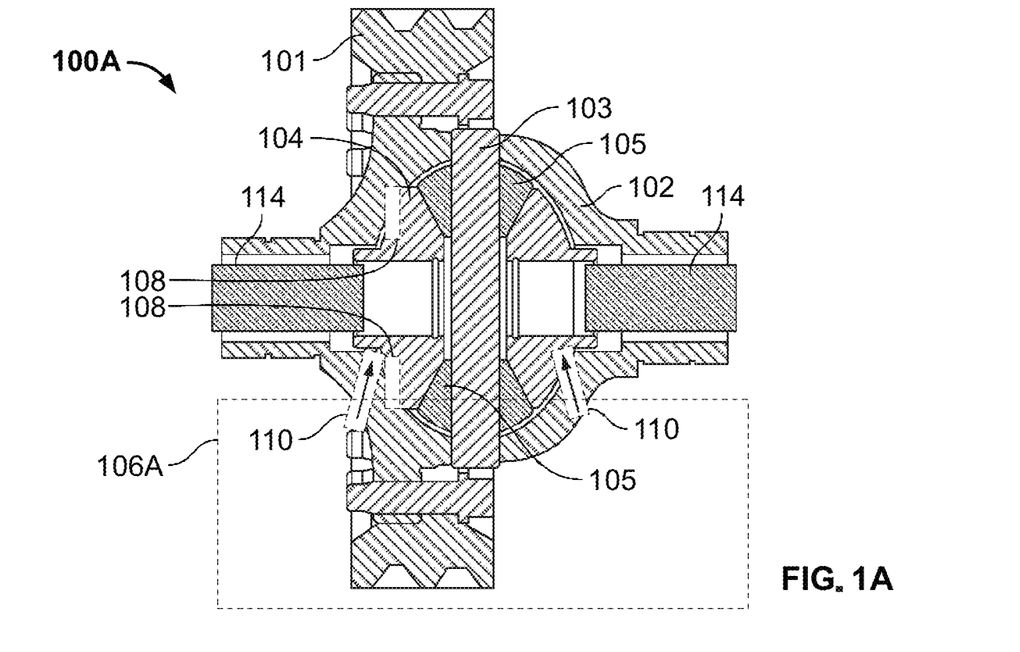
FIGS. 1A and 1B illustrates a pair of examples of differential assemblies with side gears having grooves for lubricating differential components, in accordance with some embodiments of the disclosure.
Figure 1B:
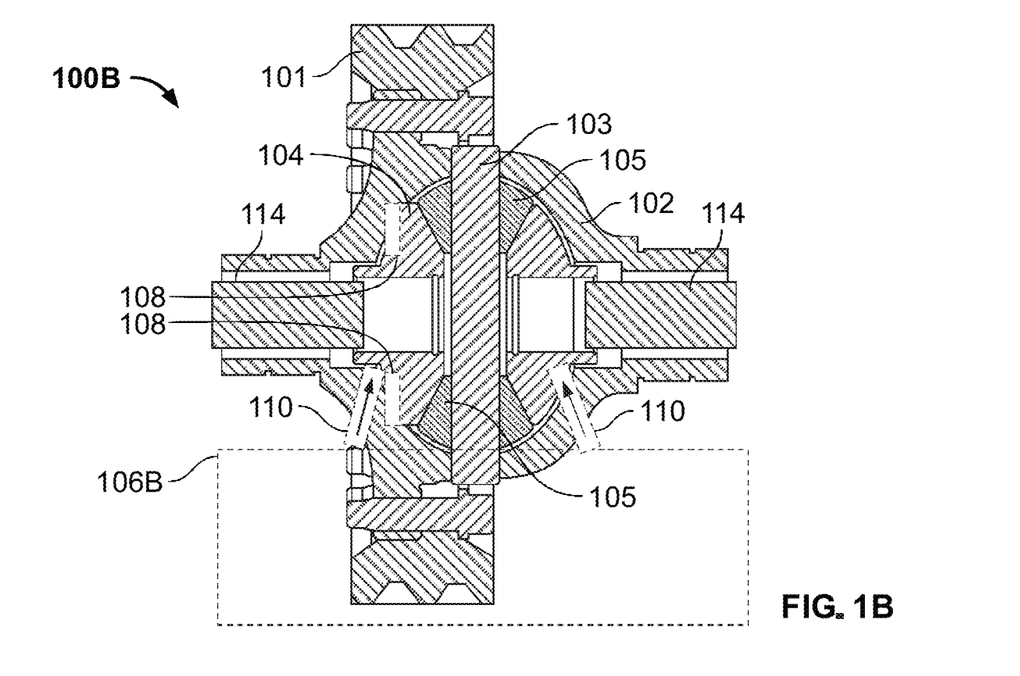

Turning now to FIGS. 1A and 1B, a pair of exemplary example differential assemblies 100A and 100B illustrated, respectively, with each having a side gear configured to distribute lubricant from a static lubrication reservoir, in accordance with some embodiments of the disclosure. It should be noted that differential assembly 100A, differential assembly 100B or any component thereof may be integrated into any of the side gears shown in FIGS. 2A and 2B, the side gears shown in FIGS. 3A and 3B, differential assembly 400 of FIG. 4, differential assembly 500 of FIG. 5, vehicle system 600 of FIG. 6, or vehicle 700 of FIG. 7.

Differential assemblies 100A and 100B are encased by housing 102. Housing 102 provides an enclosure for a plurality of interfacing components that are part of differential assemblies 100A and 100B. For example, the interfacing components may include at least one side gear, a collection of spider gears, a pair of axle shafts with side gears positioned at the ends of the axle shafts, and a pinion gear. The pinion gear may be positioned to translate rotational motion from a transmission assembly into the differential assembly. The pinion gear may interface with a plurality of protrusions of the side gear to translate rotational motion to the spider gears. The spider gears may be positioned to interface with the ring and gear translate rotational motion to wheel assemblies affixed to the axle shafts.

Side gear 104 is positioned within housing 102. The edge of side gear 104 is positioned such as it rotates, lubrication from a static lubrication reservoir, in which housing 102 resides, is drawn into radial grooves 108. Radial grooves 108 may be positioned in one side gear 104 or both side gears 104 of the differential assemblies 100A, 100B. The radial grooves 108 are structured such that as side gear 104 rotates, lubrication is drawn into each respective groove. Lubrication channels 110 enable the egress of lubrication from the static lubrication reservoir into housing 102 such that each of radial grooves 108 takes in a portion of lubrication and distributes the lubrication through the internal components of encased within housing 102.

The lubrication level may be represented by lubrication level 106A or 106B, depending on desired performance parameters for each of differential assemblies 100A and 100B, respectively. Lubrication reservoir 106A is at a depth such that at least a portion of radial grooves 108 is submerged below the surface of lubrication reservoir 106A. This enables a continuous submersion of side gear 104 in lubrication reservoir 106A to ensure a continuous distribution of lubrication within housing 102. By contrast, lubrication reservoir 106B is at a depth such that radial grooves 108 are not submerged below the surface of lubrication reservoir 106B. In some embodiments, lubrication reservoir 106B may be preferred as the lower lubrication level reduces overall friction within the unit. As a result, side gear 104 is free to accelerate and rotate at faster rates due to the reduction in drag. As side gear 104 rotates, lubrication from lubrication reservoir 106B pumped to the grooves 108 via lubrication channels 110, which each have an end submerged below the surface of lubrication reservoir 106B. The rotation of side gear 104 may create a pressure differential between a first end of each of lubrication channels 110 which is open to the internal structures encased by housing 102 and the second end of each of lubrication channels 110 which is submerged below the surface of lubrication reservoir 106B. The pressure differential may cause the ingress of lubrication from lubrication reservoir 106B into housing 102 such that the lubrication is fed into radial grooves and distributed throughout the interfaces of differential assembly 100B.

In one example, lubrication channels 110 may be positioned such that an inner opening of each of lubrication channels 110 aligns with a radially outer end of radial grooves 108. In this example, any pumping of the lubrication may result in the lubrication being pooled in the bottom of the housing for the radially outer edge of the side gear to rotate thorough. In another example, lubrication channels 110 in the housing may be positioned such that an inner opening of each of lubrications channels 110 aligns with a radially inner end of the radial grooves 108 (e.g., as shown in FIGS. 1A and 1B). In this example, any pumping of the lubrication results in a direct translation of the lubrication from the reservoir through lubrication channels 110 to radial grooves 108 such that the lubrication does not pool in the housing as a result of the pumping and instead the lubrication is readily distributed by the rotation of the side gears.

Figure 2A:
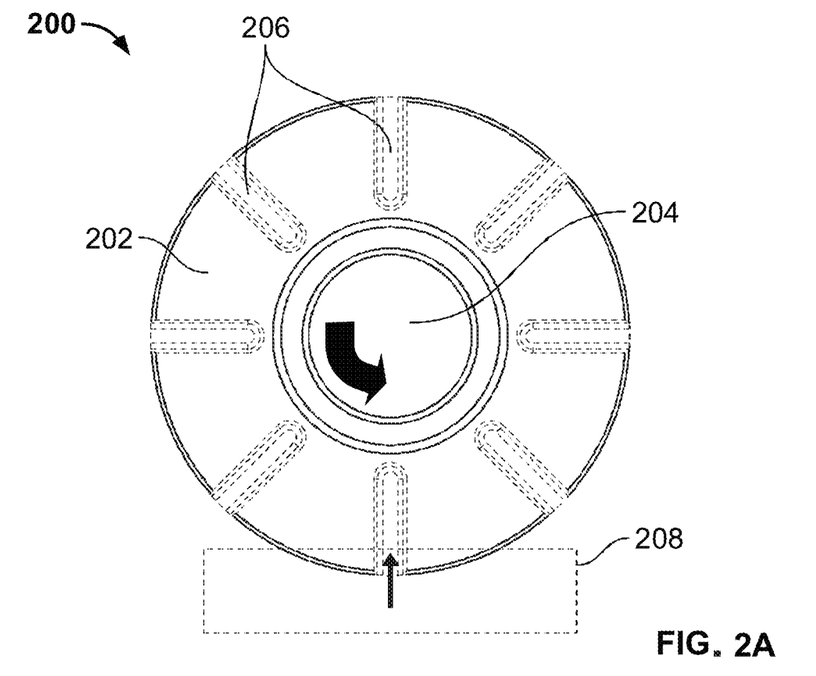
FIGS. 2A and 2B illustrate a pair of views of an exemplary side gear with a plurality of grooves, in accordance with some embodiments of the disclosure.
Figure 2B:
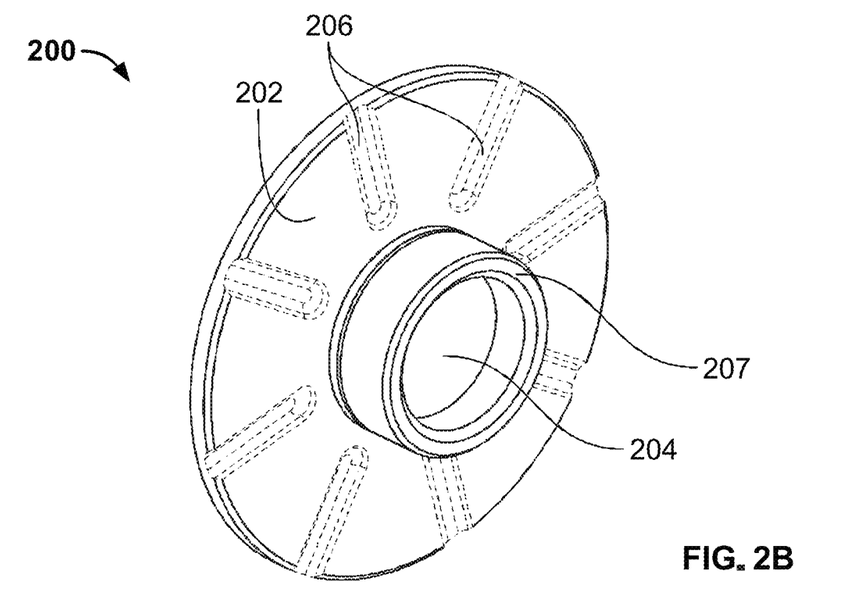

FIGS. 2A and 2B illustrate an exemplary side gear 200, each with a plurality of grooves, in accordance with some embodiments of the disclosure. It should be noted that side gear 200 or any component thereof may be integrated into any of the differential assemblies of FIG. 1, the side gears of FIGS. 3A and 3B, differential assembly 400 of FIG. 4, differential assembly 500 of FIG. 5, vehicle system 600 of FIG. 6, or vehicle 700 of FIG. 7.

Side gear 200, as shown in FIGS. 2A and 2B, includes surface 202 arranged to face away from the center portion of a differential assembly (e.g., differential assembly 100 of FIG. 1). An opposite face of the side gear 200 may include protrusions or gears configured to mate with other gears of a differential. Central opening 204 is an opening through which an axle shaft protrudes to create an interface with other internal rotating components within the differential assembly (e.g., interface with spider gears). Radial grooves 206 are grooves embedded in surface 202 and, in some examples, are positioned such that at least a portion of each of radial grooves 206 reach below lubrication level 208 as surface 202 rotates about a central axis. Alternatively, a lubrication level may be relatively lower, as noted above. Each of radial grooves 206 are arranged such that both a radially inward most point and a radially outward most point are radially aligned without an angular offset.

Side gear 200 is shown as a perspective view of a side gear with radial grooves 206 in FIG. 2B. As shown in FIG. 2B, each of radial grooves 206 of the side gear 200 comprise a depth that is below surface 202, but do not create an opening through the side gear 200. Additionally, each of radial grooves 206 have a radially inner end which does not contact a structure which borders central opening 204, e.g., a hub 207 of the side gear 200. The depth, length, and width of each of radial grooves may be determined based on factors such as rotational speed of side gear 200, desired lubrication levels within a differential assembly that utilizes side gear 200, and the number of grooves required to maintain an idea distribution of lubrication.

Figure 3A:
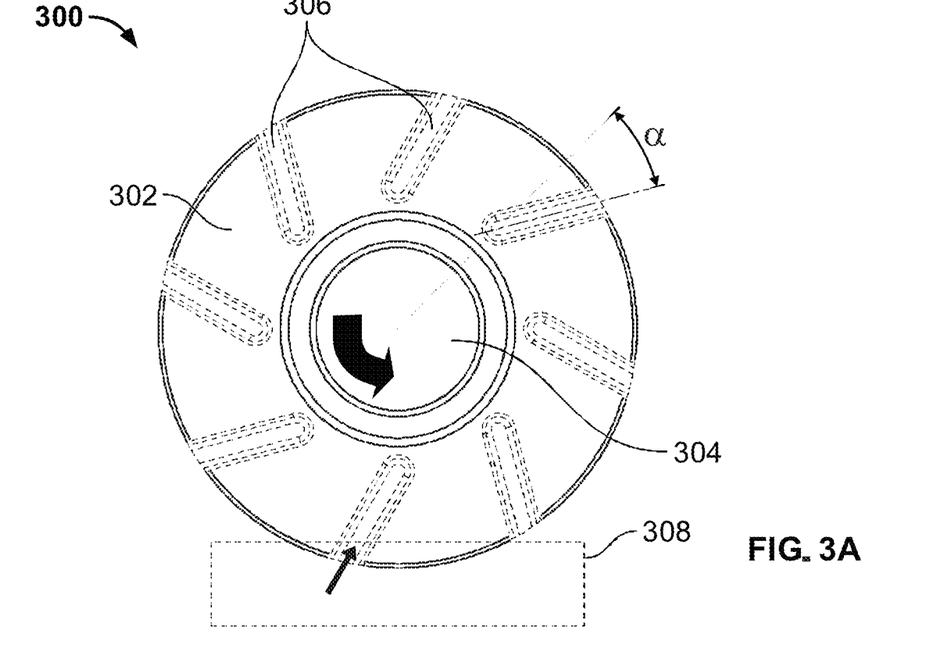
FIGS. 3A and 3B illustrate a pair of views of an exemplary side gear with a plurality of angled grooves, in accordance with some embodiments of the disclosure.
Figure 3B:
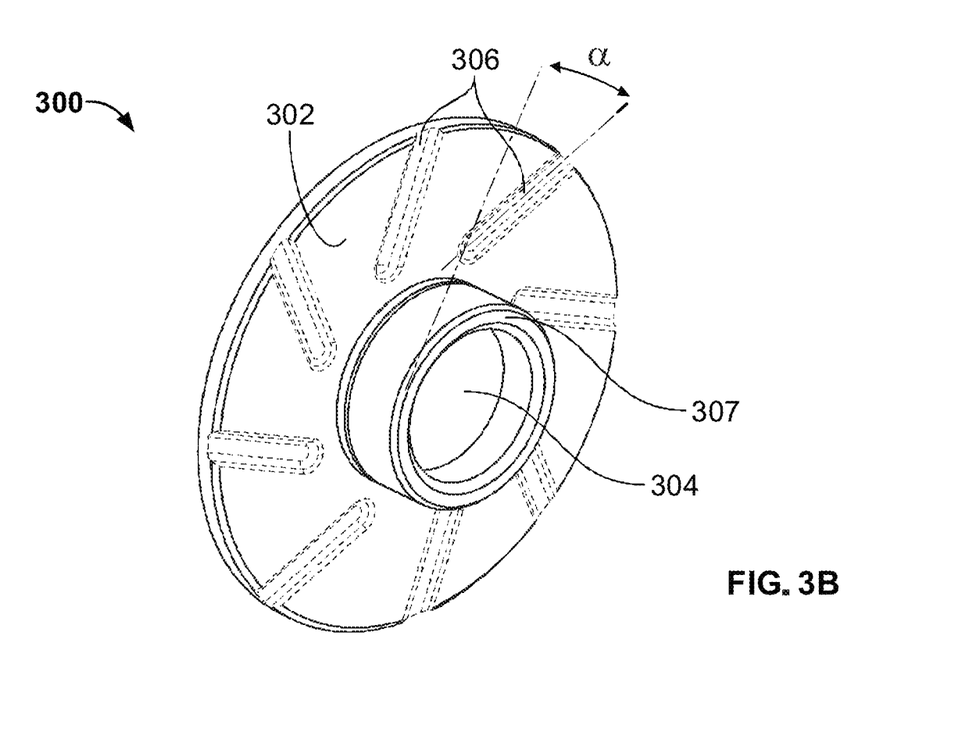

Turning now to FIGS. 3A and 3B, an exemplary side gear 300 is illustrated with a plurality of angled grooves, in accordance with some embodiments of the disclosure. It should be noted that side gear 300 or any component thereof may be integrated into any of the differential assemblies of FIG. 1, the side gears of FIGS. 2A and 2B, differential assembly 400 of FIG. 4, differential assembly 500 of FIG. 5, vehicle system 600 of FIG. 6, or vehicle 700 of FIG. 7.

Side gear 300, as shown in FIGS. 3A and 3B, includes surface 302 arranged to face away from the center portion of a differential assembly (e.g., differential assembly 100 of FIG. 1). Central opening 304 is an opening through which an axle shaft with a side gear protrudes to create an interface with other internal rotating components within the differential assembly (e.g., interface with spider gears). Radial grooves 306 are grooves embedded in surface 302 and are positioned such that at least a portion of each of radial grooves 306 reach below lubrication level 308 as surface 302 rotates about a central axis. Alternatively, a lubrication level may be relatively lower, as noted above. Each of radial grooves 306 are arranged such that a radially inward most point and a radially outward most point are not radially aligned. Angle α of each of radial grooves 306 relative to a radial direction of the side gear 300 is based on a rotational speed corresponding to when components of the different will be disengaged such that lubrication can be circulated throughout the differential without translating rotational motion to wheel assemblies.

Angle α also corresponds to an ideal lubrication rate such that the lubrication drawn into the collection of grooves can adequately enable lubrication of all interfaces within the differential assembly. In one example, the channels in the housing may be positioned such that an inner opening of the channel aligns with a radially outer end of radial grooves 306, as shown in FIG. 3A. In this example, any pumping of the lubrication may result in the lubrication being pooled in the bottom of the housing for the radially outer edge of side gear 300 to rotate thorough. In another example, the channels in the housing may be positioned such that an inner opening of the channel aligns with a radially inner end of radial grooves 306 of the side gear (e.g., as shown in FIGS. 1A and 1B). In this example, any pumping of the lubrication results in a direct translation of the lubrication from the reservoir through the channels to radial grooves 306 in the side gear such that the lubrication does not pool in the housing as a result of the pumping and instead the lubrication is readily distributed by the rotation of the side gears.

Side gear 300 is illustrated in a perspective view of a side gear with radial grooves 306 in FIG. 3B. As shown in FIG. 3B, each of radial grooves 306 comprise a depth that is below surface 302, but do not create an opening in the material comprising side gear 300. Additionally, each of radial grooves 306 have a radially inner end which does not contact a structure which borders central opening 304, e.g., hub 307. The depth, length, and width of each of radial grooves may be determined based on factors such as rotational speed of side gear 300, desired lubrication levels within a differential assembly that utilizes side gear 300, and the number of grooves required to maintain an idea distribution of lubrication. Additionally, angle α may be considered in the length, width, depth, and number of radial grooves 306 as angle α may increase the overall length of radial grooves 306 relative to radial grooves 206 from FIGS. 2A and 2B.

Angle α may also correspond to an ideal lubrication rate such that the lubrication drawn into the collection of grooves can adequately enable lubrication of all interfaces within the differential assembly. For example, a greater value corresponding to angle α will tend to create a greater lubrication rate by "pumping" a greater amount of lubricant from below the lubrication level 308 for a given rotational speed of side gears 300A and 300B. More specifically, the greater value corresponding to angle α enables a generally longer embodiment of grooves 306 compared with a groove that is aligned with a radial direction of the surface 302 (e.g., as shown by the grooves of side gears 200A and 200B compared to the grooves of side gears 300A and 300B). Accordingly, the angled grooves 306 proportionally increase an amount of lubricant volume contained by the grooves 306 and/or that is communicated throughout a differential assembly.

In some embodiments, angle α is an acute angle (e.g., less than 90 degrees and not perpendicular) and does not exceed a value such that grooves 306 rotate parallel to the outer diameter of side gears 300A and 300B. If angle α were to position each of grooves 306 such that they create circular grooves on the surface of ring gears 300A and 300B, then there would be no edge of grooves 306 to rotate through lubrication level 308 and draw in lubrication to distribute about the differential assembly comprising side gears 300A and 300B.

In one example, the channels in the housing may be positioned such that an inner opening of the channel aligns with a radially outer end of radial groves 306 (e.g., as shown in FIG. 3A). In this example, any pumping of the lubrication may result in the lubrication being pooled in the bottom of the housing for the radially outer edge of the side gear to rotate thorough. In another example, the channels in the housing may be positioned such that an inner opening of the channel aligns with a radially inner end of radial grooves 306. In this example, any pumping of the lubrication results in a direct translation of the lubrication from the reservoir through the channels to radial grooves 306 such that the lubrication does not pool in the housing as a result of the pumping and instead the lubrication is readily distributed by the rotation of the side gears.

In some embodiments, the shape of radial grooves 306 is configured for additional oil flow to achieve target lubrication rates and target cooling rates. In some embodiments, the shape of radial grooves 306 comprises a profile with at least one rounded side. Rounded grooves may generally prevent sharp corners which might otherwise act as stress-concentrators. Additionally, rounded grooves may also be forged into the gear, improving a material grain-flow around the groove and improving strength of the component in which the groove is formed. In some embodiments, a particular use case of radial grooves 306 may determine an optimum groove geometry. For example, use cases driving groove geometry may include a target operating temperature and/or operating temperature range, a target operating rotational speed and/or operating rotational speed range, different lubrication or oil viscosity and/or other properties related to lubrication flow, and the expected duty cycle of a differential assembly comprising radial grooves 306. Generally larger groove cross-sectional areas may allow more oil flow for better lubrication and cooling, while limiting flow by way of a relatively smaller cross-sectional area may improve overall efficiency (i.e., less viscous losses). In some embodiments, the profile of the cross-section of each of radial grooves 306 may be the same for the entire groove opening. In some embodiments, the profile of the cross-section of each of radial grooves may be varying along each groove opening. For example, a decreasing cross-section could be used to accelerate oil flow along the groove, or the majority of the groove could be over-sized and may narrow at a radially outboard portion exit to reduce losses due to turbulence or friction.

Figure 4:
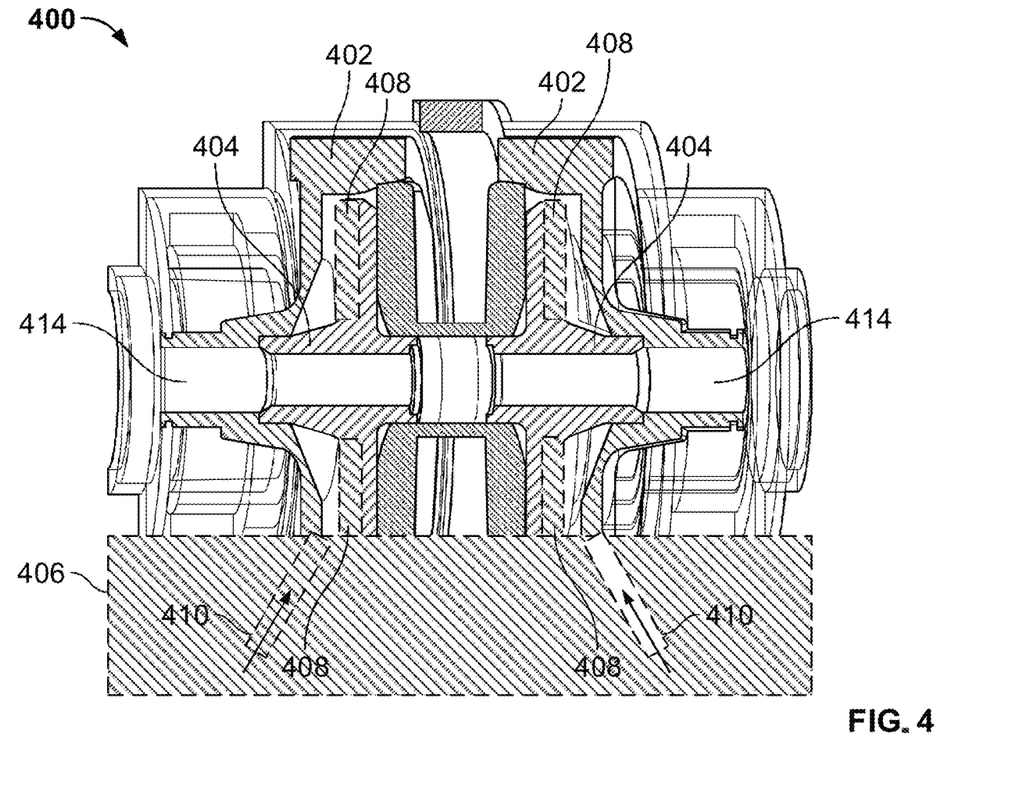
FIG. 4 illustrates an example of a differential assembly with a pair of separate side gears, in accordance with some embodiments of the disclosure.

FIG. 4 illustrates exemplary differential assembly 400 with a pair of separate side gears, in accordance with some embodiments of the disclosure. It should be noted that differential assembly 400 may include any of the components described above, e.g., of differential assembly 100 of FIG. 1, side gear 200 of FIGS. 2A and 2B, or side gear 300 of FIGS. 3A and 3B. Differential assembly 400 or any component thereof may also be integrated into any of differential assembly 500 of FIG. 5, vehicle system 600 of FIG. 6, or vehicle 700 of FIG. 7.

Differential assembly 400 is encased by housing 402. Housing 402 generally provides an enclosure for a plurality of interfacing components that are part of differential assembly 400. The differential assembly 400 may be configured to transmit rotational motion from a pinion gear (not shown in FIG. 4) being driven by an electric motor, transmission, or the like to a pair of side gears 404. The side gears 404 each drive a corresponding axle shaft 414. Differential assembly 400 generally facilitates isolated translation of rotational motion to a pair of wheel assemblies associated with each of the axle shafts 414.

The gears 404 are positioned within the housing 402. The edge of the gears 404 are positioned such that they rotate through a surface of lubrication level 406, which is a level of lubrication as created by a static lubrication reservoir in which housing 402 resides. Radial grooves 408 may be positioned on one or, as shown in FIG. 4, both of the side gears 404. The grooves 408 are drawn through lubrication level 406 as side gears 404 rotate within housing 402. Lubrication channels 410 may generally facilitate delivery of lubricant from the static lubrication reservoir into housing 402, such that each of radial grooves 408 takes in lubricant and distributes the lubrication through the internal components of encased within housing 402. In one example, the channels in the housing may be positioned such that an inner opening of the channel aligns with a radially outer end of the grooves in the side gear. In this example, any pumping of the lubrication may result in the lubrication being pooled in the bottom of the housing for the radially outer edge of the side gear to rotate thorough. In another example, the channels in the housing may be positioned such that an inner opening of the channel aligns with a radially inner end of the grooves of the side gear. In this example, any pumping of the lubrication results in a direct translation of the lubrication from the reservoir through the channels to the grooves in the side gear such that the lubrication does not pool in the housing as a result of the pumping and instead the lubrication is readily distributed by the rotation of the side gears.

Figure 5:
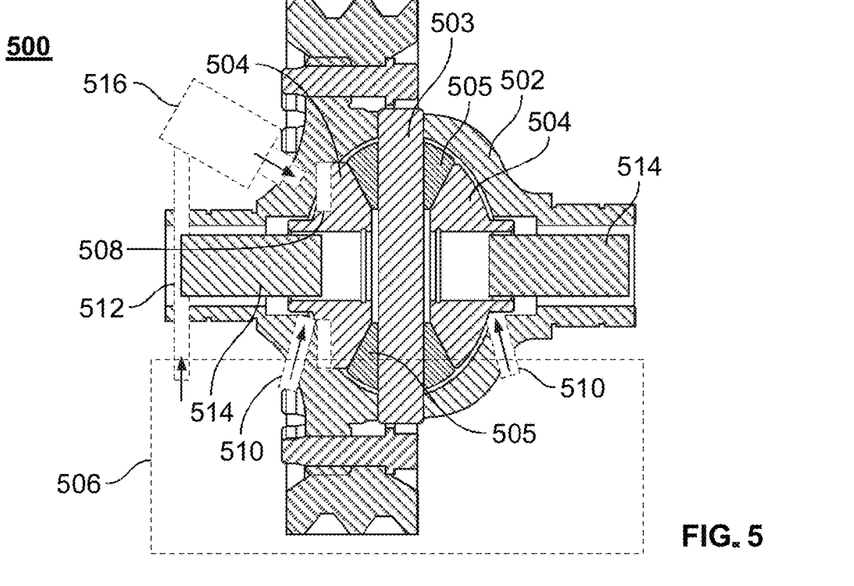
FIG. 5 illustrates an example of a differential assembly with a pumping mechanism, in accordance with some embodiments of the disclosure.

FIG. 5 illustrates exemplary differential assembly 500 with a pump, in accordance with some embodiments of the disclosure. It should be noted that differential assembly 500 or any component thereof may be integrated into any of differential assembly 100 of FIG. 1, side gear 200 of FIGS. 2A and 2B, side gear 300 of FIGS. 3A and 3B, differential assembly 400 of FIG. 4, vehicle system 600 of FIG. 6, or vehicle 700 of FIG. 7.

Differential assembly 500 includes a housing 502. Housing 502 provides an enclosure for a plurality of interfacing components that are part of differential assembly 500. For example, the housing 502 may be fixed for rotation with a pair of side gears driven by at least one pinion receiving rotational power from an electric motor, transmission, etc. (not shown in FIG. 5). The housing 502 may drive rotation of a pair of side gears 504 and allow for differential speeds of rotation by way of differential gears 505 supported on a spindle 503.

The side gears 504 are positioned within housing 502. The edge of side gears 504 may each be positioned such that a lower portion thereof rotates through the surface of lubrication level 506, which may be a level of lubrication created by a static lubrication reservoir within the housing 502. Radial grooves 508 are positioned on side gear 504 and are drawn through lubrication level 506 as side gears 504 rotates within housing 502. The radial grooves 508 may be radially aligned, e.g., as described above in FIGS. 2A and/or 2B, or may be angled as illustrated in FIGS. 3A and/or 3B. Lubrication channels 510 facilitate delivery of lubricant from the static lubrication reservoir 506 into housing 502, such that each of radial grooves 508 takes in lubricant and distributes the lubrication through the internal components of encased within housing 502 as a result of the rotation of the side gear(s) 504. The side gears 504 each drive a corresponding axle shaft 514. Differential assembly 500 generally facilitates isolated translation of rotational motion to a pair of wheel assemblies associated with each of the axle shafts 514.

The differential assembly 500 may employ a pump for further enhancing distribution of lubricant within the differential assembly 500. For example, lubrication distribution line 512 reaches below lubrication level 506 and channels lubricant into pump 516. Pump 516 may be positioned in an upper portion of housing 502 as shown in FIG. 5, and thus may be configured to pump lubricant from the reservoir 506 into housing 502 from an elevated position. Pump 516 may in some embodiments pump lubricant directly into at least one of radial grooves 508.

Figure 6:
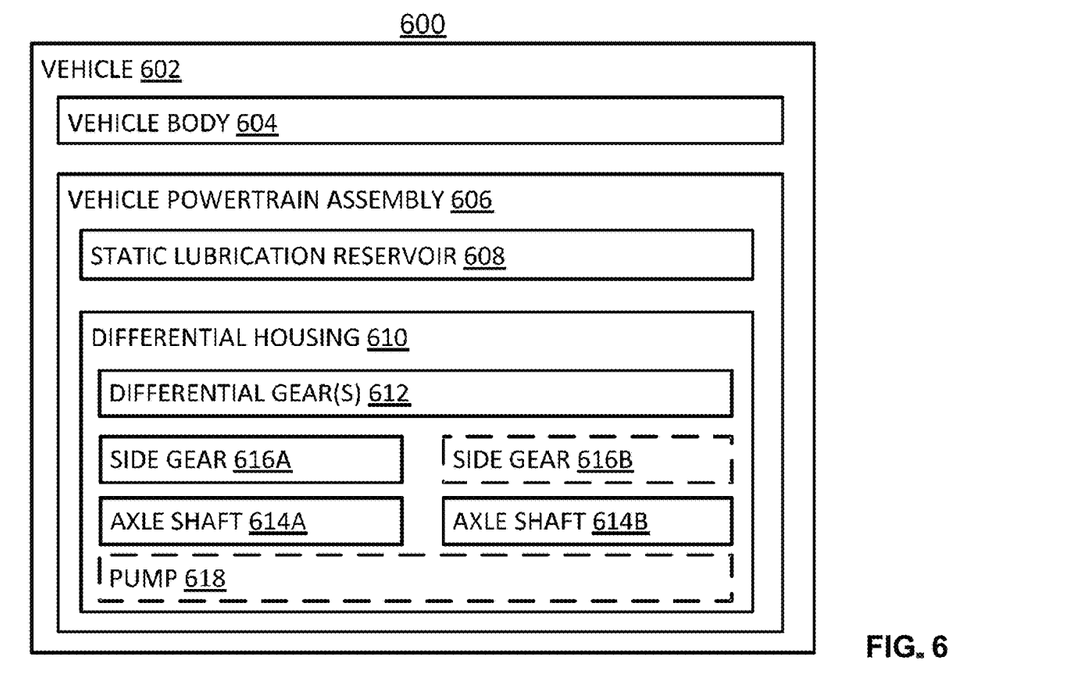
FIG. 6 shows a schematic diagram of an illustrative vehicle system with a differential assembly incorporating a side gear configured to improve lubrication within the differential assembly, in accordance with some embodiments of the disclosure.

FIG. 6 shows a schematic diagram of illustrative vehicle system 600 with a differential assembly configured to improve lubrication within the differential assembly, in accordance with some embodiments of the disclosure. It should be noted that vehicle 600 or any component thereof may be integrated into any of differential assembly 100 of FIG. 1, side gear 200 of FIGS. 2A and 2B, side gear 300 of FIGS. 3A and 3B, differential assembly 400 of FIG. 4, and differential assembly 500 of FIG. 5.

Vehicle 602 includes vehicle body 604 and vehicle powertrain assembly 606. The powertrain assembly 606 may include one or more electric motors, an internal combustion (IC) engine, or any other engine for providing rotational power to provide motive force for vehicle 602. Accordingly, the vehicle 602 may be a battery-electric vehicle (BEV), a hybrid vehicle employing a combination of electric motor(s) with an IC engine, or a vehicle relying solely upon an IC engine for motive power. Within vehicle powertrain assembly 606, there is a static lubrication reservoir 608. Static lubrication reservoir 608 is a source of lubrication for differential housing 610 and the interfacing components therein. A differential housing 610 may be rotated by a pinion gear receiving rotational power from an electric motor, engine, transmission, etc. The differential housing 610 may in turn drive axle shafts 614A and 614B, e.g., by way of one or more differential gear(s) 612 that rotate with the housing 610 and in turn rotate side gears 616A and/or 616B. Side gears 616A and 616B may be represented by any of the side gears described above in FIGS. 1-5. Additionally, in some embodiments differential housing 610 interfaces with a pump 618. The pump 618 may in some embodiments correspond to pump 516 of FIG. 5. Pump 618 may represent any form of mechanism that, when coupled with differential housing 610, enables additional forced lubrication of the components interfacing within differential housing 610.

Figure 7:
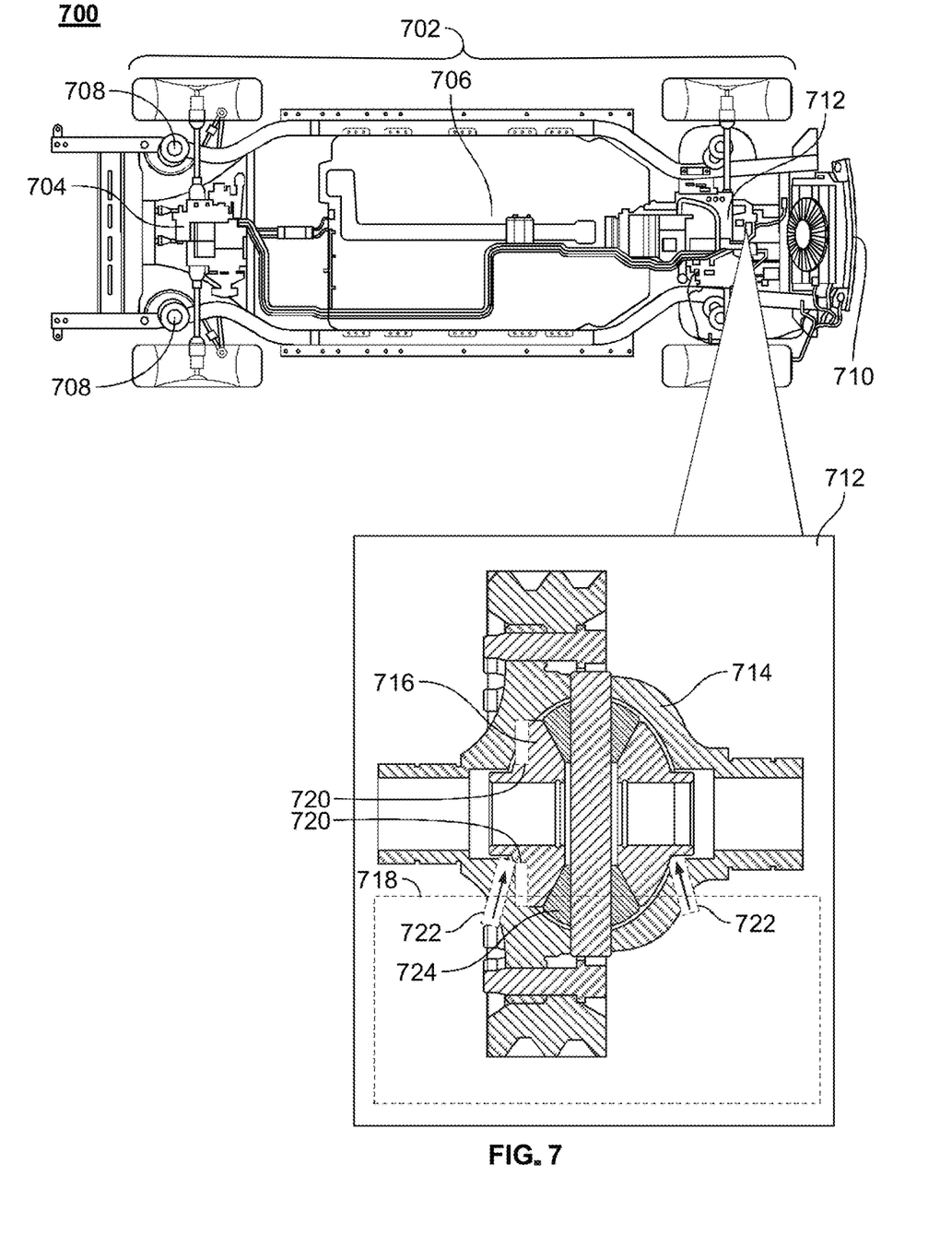
FIG. 7 shows an illustrative vehicle system with a differential assembly incorporating a side gear configured to improve lubrication within the differential assembly, in accordance with some embodiments of the disclosure.

Turning now to FIG. 7, an illustrative vehicle system 700 is shown having a differential assembly incorporating side gear(s) configured to improve lubrication within the differential assembly, in accordance with some embodiments of the disclosure. It should be noted that vehicle 700 or any component thereof may be integrated into any of differential assembly 100 of FIG. 1, side gear 200 of FIGS. 2A and 2B, side gear 300 of FIGS. 3A and 3B, differential assembly 400 of FIG. 4, differential assembly 500 of FIG. 5, and vehicle system 600 of FIG. 6.

Vehicle system 700 includes vehicle support structure 702. As illustrated, vehicle support structure 702 is a "skateboard" structure, to which a vehicle passenger compartment, cargo area (not shown), etc. may be mounted. Mounted in vehicle support structure 702 are one or more electric motors 704, battery packs 706, suspension 708, and fan assembly 710. Motor 704 is powered by battery packs 706 and generally provides rotational motion via differential 712 to vehicle wheels. Vehicle system 700 may include elements of vehicle system 600 of FIG. 6, as well as any of the other elements depicted in FIGS. 1-5, or a combination thereof. Differential 712 may include the elements of differential assembly 100 of FIG. 1, differential assembly 400 of FIG. 4, or any combination of elements as depicted in FIG. 2A, 2B, 3A, 3B, 5, or 6.

Differential 712 may be include a housing 714. Housing 714 provides an enclosure for a plurality of interfacing components that are part of differential 712. For example, as discussed above a side gear fixed for rotation with the housing 714 may be driven by a pinion gear (not shown in FIG. 7), which in turn rotates a spindle having a pair of differential gears 724. The differential gears in turn drive side gears 716 of the differential assembly 712, and allow for different rotational speeds of corresponding axle shafts, for example in the manner described above.

Side gears 716 may each be positioned within housing 714. The edge of side gears 716 may be positioned such that they rotate through a surface of lubrication level 718 which is a level of lubrication as created by a static lubrication reservoir in which housing 714 resides. Radial grooves 720 may be positioned on one or both side gear(s) 716 and are drawn through lubrication level 718 as side gear 716 rotates within housing 714. Lubrication channels 722 may also be provided, which may introduce lubricant from the static lubrication reservoir 718 into housing 714 such that each of radial grooves 720 takes lubricant and distributes the lubricant throughout the internal components of encased within housing 714. In some embodiments, radial grooves 720 may be embedded in a hub separate from side gear 716 that is mechanically secured to side gear 716 such that the hub rotates with side gear 716.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A differential system, comprising:
   a passage in a differential casing comprising a pickup point arranged to draw lubrication from a lubrication reservoir, wherein the pickup point of the passage is submerged in the lubrication reservoir; and
   a radial groove of a side gear, the radial groove comprising an inner point configured to receive the lubrication drawn through the passage from the pickup point, wherein;
      the pickup point is radially outward of an outer point of the radial groove; and
      the lubrication is ejected radially from the inner point to the outer point as the side gear rotates.

2. The differential system of claim 1, wherein rotation of the side gear creates a pressure differential causing ingress of the lubrication from the lubrication reservoir into the differential casing via the passage.

3. The differential system of claim 1, wherein the radial groove extends from the inner point to the outer point, the outer point being proximate to an outer diameter of the side gear, wherein the outer point is in radial alignment with the inner point.

4. The differential system of claim 1, wherein the radial groove extends from the inner point to the outer point, the outer point being proximate to an outer diameter of the side gear, and wherein the outer point is radially displaced from the inner point such that the radial groove defines an acute angle relative to a radial direction extending from a center of the side gear.

5. The differential system of claim 1, wherein the radial groove is positioned such that rotational motion of the side gear draws in lubrication from the lubrication reservoir into the radial groove.

6. The differential system of claim 1, wherein the radial groove is one of a plurality of radial grooves evenly spaced about a perimeter of the side gear such that at least a portion of one of the plurality of radial grooves is submerged in the lubrication reservoir for each rotational position of the side gear.

7. The differential system of claim 1, wherein:
   the side gear comprises a first face having gears configured to engage a corresponding gear of the differential system;
   the radial groove is one of a plurality of radial grooves;
   each of the plurality of radial grooves is embedded in a second face of the side gear opposite the first face; and each of the plurality of radial grooves defines a groove depth with respect to the second face.

8. The differential system of claim 1, wherein the radial groove has at least one end forming a radial opening for ingress of the lubrication from the lubrication reservoir.

9. The differential system of claim 1, wherein the pickup point is below a static level of the lubrication reservoir.

10. A differential assembly, comprising:
a pair of differential gears configured to translate rotational motion to a pair of axle shafts;
a passage in a differential casing that houses the pair of differential gears comprising a pickup point arranged to draw lubrication from a lubrication reservoir, wherein the pickup point of the passage is submerged in the lubrication reservoir; and
a radial groove of a side gear of the pair of differential gears, the radial groove comprising an inner point configured to receive the lubrication drawn through the passage from the pickup point, wherein:
the pickup point is radially outward of an outer point of the radial groove; and
the lubrication is ejected radially from the inner point to the outer point as the side gear rotates.

11. The differential assembly of claim 10, wherein the pickup point is below a static level of the lubrication reservoir.

12. The differential assembly of claim 10, wherein the radial groove extends from the inner point to the outer point, the outer point being proximate to an outer diameter of the side gear, wherein the outer point is in radial alignment with the inner point.

13. The differential assembly of claim 10, wherein the differential gears each comprise a respective first face having gears configured to engage a corresponding gear of the differential assembly, wherein the radial groove is embedded in a second face of the side gear opposite the respective first face, and wherein the radial groove defines a groove depth with respect to the second face.

14. The differential assembly of claim 10, wherein the radial groove is one of a plurality of radial grooves evenly spaced such that at least one portion of one of the plurality of radial grooves is submerged in the lubrication reservoir for each rotational position of the side gear.

15. The differential assembly of claim 10, wherein the radial groove is embedded in a second face of the side gear opposite a first face of the side gear defining gears configured to engage one or more mating gears of the differential assembly, such that a volume corresponding to a sum of space created by the radial groove and a plurality of other radial grooves corresponds to a target lubrication rate.

16. The differential assembly of claim 10, wherein the radial groove has an end forming a radial opening configured to receive a lubricant from the lubrication reservoir of the differential assembly.

17. A differential assembly comprising:
a pair of side gears configured to translate rotational motion to a pair of axle shafts;
a passage in a differential casing that houses the pair of side gears, the passage comprising a pickup point arranged to draw lubrication from a lubrication reservoir;
a radial groove of a side gear of the pair of side gears, the radial groove comprising an inner point configured to receive the lubrication drawn through the passage from the pickup point, wherein the lubrication is ejected radially from the inner point to an outer point of the radial groove; and
a pump configured to pump lubrication from the lubrication reservoir to a top portion of an enclosure of the differential casing.

18. The differential assembly of claim 17, wherein the differential assembly comprises an open differential.

19. The differential assembly of claim 17, wherein the pump is configured to pump lubrication directly into the radial groove.

20. The differential assembly of claim 17, wherein the pump is positioned in an upper portion of the differential casing.

* * * * *